(No Model.)
J. M. DAVIDSON.
ATTACHMENT FOR SCREW THREADING MACHINES.
No. 598,196. Patented Feb. 1, 1898.
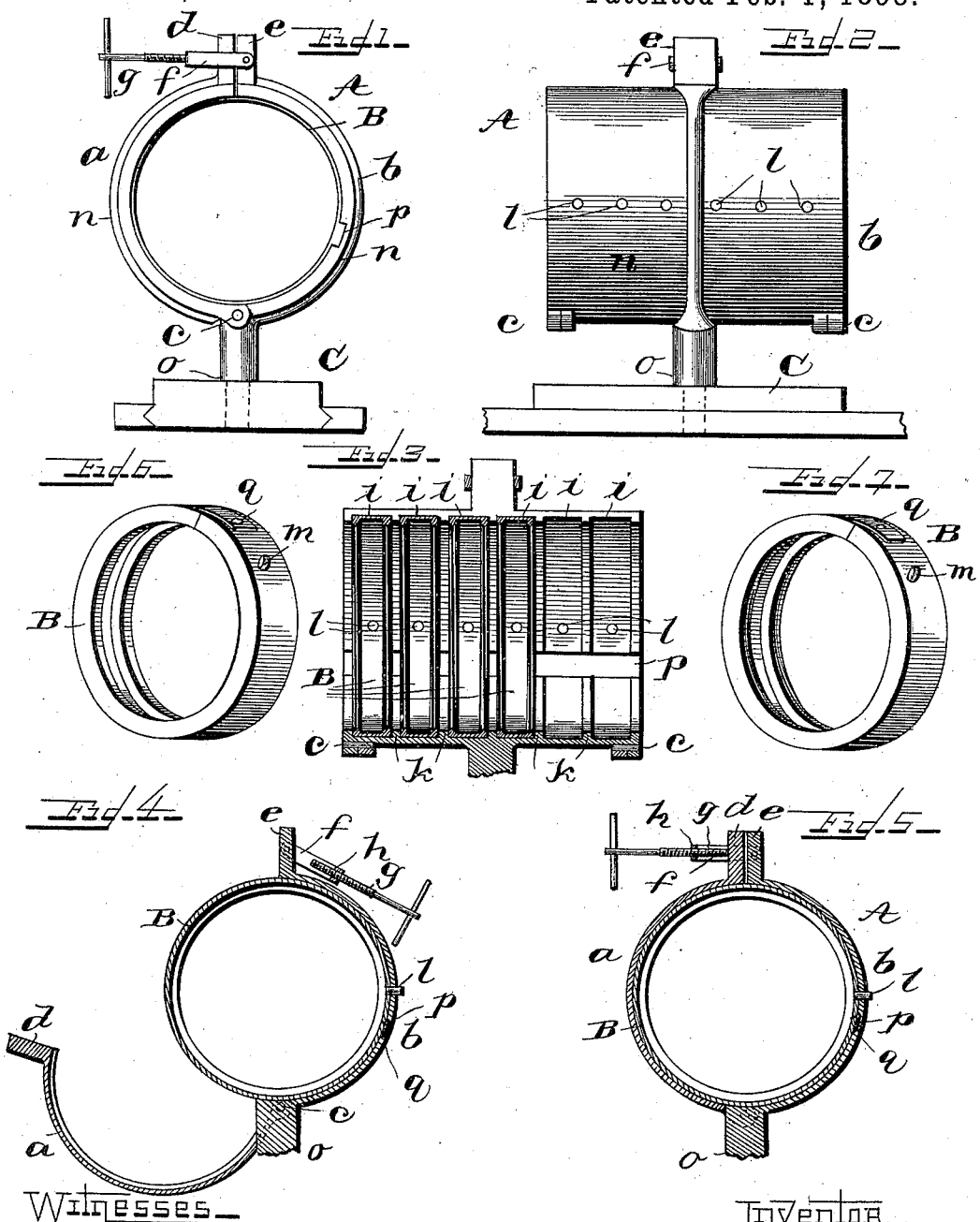

UNITED STATES PATENT OFFICE.

JOHN M. DAVIDSON, OF ALLEGHENY, PENNSYLVANIA.

ATTACHMENT FOR SCREW-THREADING MACHINES.

SPECIFICATION forming part of Letters Patent No. 598,196, dated February 1, 1898.

Application filed September 13, 1897. Serial No. 651,439. (No model.)

*To all whom it may concern:*

Be it known that I, JOHN M. DAVIDSON, a citizen of the United States, residing at Allegheny, in the county of Allegheny and State of Pennsylvania, have invented certain new and useful Improvements in Attachments for Screw-Threading Machines; and I do hereby declare the following to be a full, clear, and exact description of the invention, such as will enable others skilled in the art to which it appertains to make and use the same.

My invention relates to machinery for cutting screw-threads, and has especial reference to a device for holding rings while being internally screw-threaded; and it consists in certain improvements in construction which will be fully disclosed in the following specification and claims.

The device is adapted for general use in screw-threading any kind of rings, such as pipe-couplings; but is especially designed for use in the manufacture of internally-screw-threaded protectors to be applied to the ends of pipes.

In the accompanying drawings, which form part of this specification, Figure 1 represents an end view; Fig. 2, a side elevation; Fig. 3, a vertical longitudinal section; Fig. 4, a transverse section showing the ring-holder open; Fig. 5, a like view showing the ring-holder closed; Fig. 6, a perspective of a ring before it is threaded, and Fig. 7 a like view of a ring after it has been threaded.

Reference being had to the drawings and the letters thereon, A indicates the non-revoluble cylindrical ring-holder made in two parts $a\ b$, pivotally secured together at $c\ c$, so that the half $a$ may be turned down, as shown in Fig. 4, to insert rings to be screw-threaded. Each half $a\ b$ is provided with a lug $d\ e$, to the latter of which is pivotally attached a yoke $f$, provided with a clamping-screw $g$, which passes through the bar $h$ of the yoke and engages the lug $d$ to secure the two parts $a\ b$ in closed position and hold rings while they are being screw-threaded.

The ring-holder is provided with a series of annular grooves $i$ to receive rings B, and the walls $k$ of the grooves separate them and the rings in the holder. The grooves are slightly wider than the rings to allow for any slight variations in the width of the rings and yet not to permit the rings to cant in the grooves when the tap is applied to cut the screw-threads, and in each groove is a pin or stud $l$ to enter a hole $m$ in the ring and prevent it turning in the groove with the revolving tap.

On the outside of the non-revoluble cylinder is a strengthening rib or flange $n$, and from the lower side of the cylinder projects a pin or stud $o$ to be inserted in a socket in a tail-stock C of a screw-threading machine to admit of lateral movement of the end of the ring-holder to aline it with the tap in the head of the screw-threading machine.

The interior of the ring-holder may be provided with a longitudinal groove $p$ to accommodate the lap $q$ on the ring B when this special form of ring is being made.

Care should be taken in forming the grooves $i$ and the rings B, so that they shall be of substantially the same diameter to hold the rings in position for screw-threading, and the walls $k$ of the grooves must be of less thickness than the thickness of the rings to prevent the tap coming in contact with them.

Having thus fully described my invention, what I claim is—

1. An attachment for screw-threading machines consisting of a non-revoluble ring-holder made in two parts pivotally connected and having means for securing them in closed position, provided with grooves to receive the rings and means on one side for connecting the ring-holder to a screw-threading machine.

2. An attachment for screw-threading machines consisting of a non-revoluble ring-holder made in two parts pivotally connected and having means for securing them in closed position, provided with grooves to receive the rings and a pin or stud on one side to engage with part of a screw-threading machine.

3. An attachment for screw-threading machines consisting of a non-revoluble ring-holder made in two parts pivotally connected and having means for securing them in closed position, provided with grooves to receive the rings, a pin in each groove and means for forming a connection between the ring-holder and a screw-threading machine to admit of lateral adjustment of the end of the ring-holder.

In testimony whereof I affix my signature in presence of two witnesses.

JOHN M. DAVIDSON.

Witnesses:
D. C. REINOHL,
D. WEIMER REINOHL.